United States Patent [19]

Fischer

[11] Patent Number: 4,551,622
[45] Date of Patent: Nov. 5, 1985

[54] DOCUMENT SCANNING APPARATUS WITH PHOTOSENSOR AND GAS DISCHARGE READOUT

[75] Inventor: Dieter Fischer, Frankfurt, Fed. Rep. of Germany

[73] Assignee: Triumph-Adler Aktiengesellschaft fur Buro- und Informationstechnik, Nurnberg, Fed. Rep. of Germany

[21] Appl. No.: 481,660

[22] Filed: Apr. 4, 1983

[30] Foreign Application Priority Data

Apr. 2, 1982 [DE] Fed. Rep. of Germany ....... 3212302

[51] Int. Cl.$^4$ ............................................. H01J 40/14
[52] U.S. Cl. .................................. 250/211 R; 250/578; 315/169.4
[58] Field of Search ............ 250/211 R, 211 J, 213 R, 250/213 UT, 374, 578; 313/537, 538, 540; 357/24 LR, 31, 32; 315/169.4

[56] References Cited

U.S. PATENT DOCUMENTS

| 2,925,530 | 2/1960 | Engelbart | 315/169.4 |
| 4,079,422 | 3/1978 | Anagnostopoulos | 250/578 |
| 4,430,564 | 2/1984 | Fischer | 250/211 R |

Primary Examiner—David C. Nelms
Attorney, Agent, or Firm—Joseph R. Spalla

[57] ABSTRACT

An arrangement for the line by line scanning of a document has a line array of individual light sensor elements each of which is characterized by a gas discharge chamber limited on one side by a cathode and on the opposite side by photoconductor layer carrying a transparent and a non-transparent signal electrode. The signal electrodes are common to all the sensor elements in the line array, extend parallel to each other, and are connected to a differential amplifier to eliminate switching transients and dark signals from the information signal.

3 Claims, 1 Drawing Figure

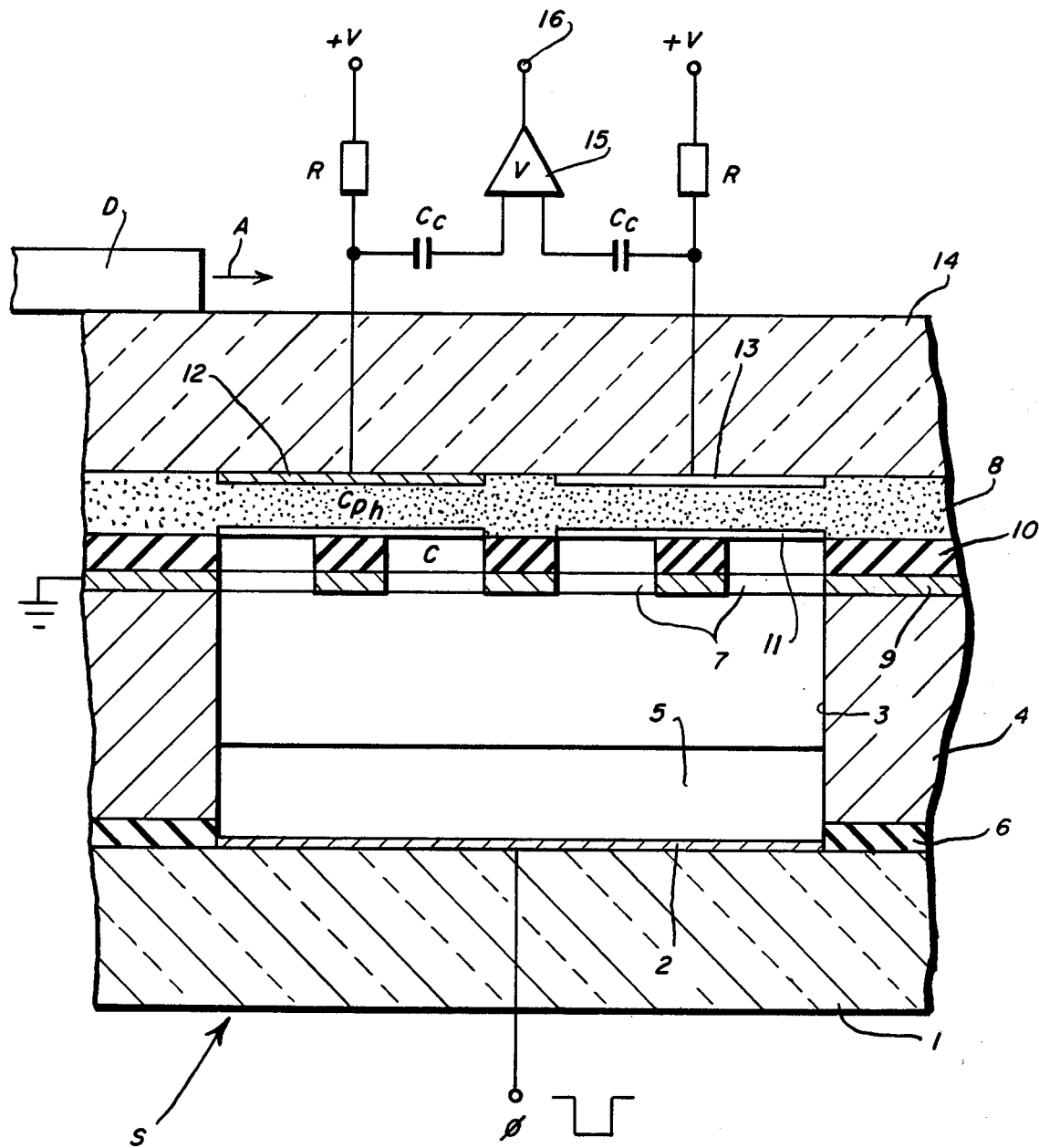

DOCUMENT SCANNING APPARATUS WITH PHOTOSENSOR AND GAS DISCHARGE READOUT

The invention relates to an arrangement for the line-by-line scanning of documents comprising a line array of individual light sensor elements each of which is characterized by a gas discharge chamber bounded on one side by a cathode and on the opposite side by a photoconductor layer carrying a pair of signal electrodes common to all the individual light sensor elements; more particularly it relates to such an array wherein one of the signal electrodes is transparent and the other non-transparent to light and wherein the electrodes are connected to a differential amplifier. Each individual light sensor element of the array is addressable in turn via voltages applied to its cathode according to the shift register principle thereby to charge a capacitor defined by the photoconductor layer to a source voltage after exposure of the photo conductive layer.

An arrangement for the line by line scanning of a document by a line array of light sensitive elements is disclosed in copending application of Fischer et al, Ser. No. 271,620, filed June 8, 1981 now U.S. Pat. No. 4,430,564 issued Feb. 7, 1984 which is incorporated by reference herein. The arrangement in said copending application operates according to the known vidicon principle, except that the photoconductive capacitors comprising the light sensitive elements are not charged by means of a deflectable electron beam, but by means of micro gas discharges in that a gas discharge is shifted along the line array of light sensitive elements by the shift register principle. This arrangement has the disadvantage that when voltages required to trigger gas discharges are switched on and off, the information signal at the output electrode common to all the elements is influenced by switching transients and dark capacitive currents which detract from the information signals.

This problem is overcome in accordance with the invention by providing an array having two output electrodes of the same width which extend parallel to each other along the line array. One output electrode is made transparent while the other is non-transparent. The signals on both output electrodes are fed to a differential amplifier. As the output at both electrodes are influenced equally by transient and dark signals, these are cancelled out in the differential amplifier and the information signal at the output of the differential amplifier represents only the amount of incident light. Since the only remaining limitation is noise, the light sensitivity is increased considerably by this arrangement.

An object of the invention to provide a line scan array of light sensors in which transient and dark currents at the output thereof are eliminated.

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

BRIEF DESCRIPTION OF THE DRAWING

The single FIGURE is a cross sectional view taken through a single light sensor element of a line array of light sensor elements adapted to scan a document line by line as the document moves in a direction perpendicular to the line array of light sensor elements.

Referring now the drawing there is shown in the FIGURE an insulating substrate 1, e.g. glass, common to a line array of light sensor elements only one of which, generally designated S, is shown in cross section perpendicular to the line of the array. The array is adapted to scan a document D line by line as a document is moved relative thereto in arrow direction A perpendicular to the line array.

Applied to the substrate 1 are cathodes 2, one associated with each of the light sensor elements S, which are connected to lines to which voltage pulses $\phi$ are applied to trigger a gas discharge as disclosed in said copending Fischer application now U.S. Pat. Nos. 4,430,564 to which reference may be made for further details.

A triggered gas discharge occurs within a discharge chamber 3 formed by a perforated metal plate 4 e.g., steel, separated from a cathode 2 by an insulator layer 6. All discharge chambers 3 of the line array are interconnected by channels 5.

The discharge chamber 3 communicates with the photoconductor layer 8 via at least two, and in the example shown, four gas gaps 7. The gas gaps 7 are preferably formed by a metal net 9, e.g. a copper net, common to all light sensor elements followed by a correspondingly perforated insulating layer 10. The net 9 comprises a ground electrode and is on the order of 3–5 $\mu$m thick.

The insulating layer 10 such as of silicon dioxide whose thickness for example may be about 2 $\mu$m, is followed by a photoconductor layer 8. Floating electrodes 11 extending over two gas gaps 7 may also be deposited on the lower side of a photoconductor layer 8 for even charge distribution. The upper side of the photoconductor layer 8 carries a non-transparent output electrode 12 and a transparent output electrode 13 whose width extends over two gas gaps 7.

The metal components comprising the above-described structure may as understood in the art be formed by photoresist masking and etching.

As disclosed in said copending Fischer, et al application now U.S. Pat. No. 4,430,564 capacitors $C_{ph}$ are defined between electrodes 12 and 13 and floating electrodes 11 and capacitors C between floating electrodes 11 and ground electrode 9. In that two signal electrodes 12 and 13 of the same width are present, of which one is transparent while the other is non-transparent, the capacity between the non-transparent electrode 12 and ground electrode 9 equals the capacity between the transparent electrode 13 and ground electrode 9. The signal electrodes 12 and 13 extend along the line array parallel to each other and are common to all light sensor elements S. The mutual spacing of the two signal electrodes may be 5 to 25 $\mu$m, preferably 10 to 20 $\mu$m. It is essential that the gas gaps 7 of each individual sensor element S be opposite the signal electrodes 12 and 13 in the same configuration and number. A transparent plate 14, e.g. glass then follows the signal electrodes 12 and 13 on photoconductor layer 8, respectively.

The two signal electrodes 12 and 13 are connected via resistors R to source voltage $+V$ and are coupled by capacitors $C_c$ to the inputs of a differential amplifier 15. The source voltage charges capacitors $C_{ph}$ defined between electrodes 12 and 13 and electrodes 11, and capacitors $C_c$ between electrodes 11 and ground electrode 9.

During exposure of the photoconductor layer 8 comprising a light sensor element S to an image over an interval between two triggered gas discharges only the capacitance Cph of the photoconductor layer 8 of the sensor element S which is located under the transparent electrode 13 is discharged to a level proportional to incident light.

To read out a light sensor element 3, a voltage pulse φ is applied to cathode 2 triggering a discharge in gas discharge chamber 3. During the gas discharge interval only the photoconductor capacitor Cph under the transparent electrode 13 is recharged again to the original potential so that a corresponding information signal occurs only at the output electrode 13. At the output 16 of the differential amplifier 15 this results in an information signal which is proportional to the amount of incident light during the exposure period. Dark currents occuring in the photoconductor layer 8 during the exposure period are identical at the electrodes 12 and 13 so that their influence is suppressed by the differential circuit 15.

When the voltage at cathode electrode 2 is switched on and off, the output at electrodes 12 and 13 are influenced by transient charging currents which, while small due to their penetration of the gas gaps 7 in the electrode 9, may still amount to a multiple of an information signal at the output electrode 13. However as output electrodes 12 and 13 are arranged symmetrical relative to the electrode 9, transient currents are identical both absolutely and timewise so that no transient signal appears at the output 16 of the differential amplifier 15.

The invention claimed is:

1. An apparatus for reading a relatively movable illuminated document comprising a line array of light responsive elements extending perpendicular to the direction of movement of said document, each of said light responsive elements comprising, a photo conductive layer having on a first side exposed to light reflected from said illuminated document a non-transparent output electrode and a transparent ouput electrode, a ground electrode spaced by an insulating layer from a second side of said photoconductive layer opposite from said first side, said ground electrode and said insulator layer having aligned perforations defining gas gaps, a gas discharge triggering electrode, and means defining a gas discharge chamber bounded by said triggering electrode and said ground electrode and said second side of said photoconductor via said gas gaps, a source voltage connected across said output and ground electrodes, means for supplying a voltage pulse to said triggering electrode to initiate a gas discharge in said gas discharge chamber whereby the discharge in said gas gaps effectively grounds the second side of said photoconductive layer and said photoconductive layer charges to said source voltage from lower voltage levels corresponding to exposure to light in intervals between successive gas discharges, a differential amplifier, and means connecting the transparent and non-transparent electrodes to the input of said differential amplifier whereby an information signal at the output of said differential amplifier will be substantially free of transient and dark currents.

2. An apparatus as recited in claim 1, wherein at least two of said gas gaps are associated with each output electrode.

3. Apparatus as recited in claim 1, including floating electrodes between the second side of said photoconductive layer and said insulator layer.

* * * * *